US012762573B2

(12) United States Patent
Yaghoubi

(10) Patent No.: US 12,762,573 B2
(45) Date of Patent: Oct. 13, 2026

(54) METHOD AND APPARATUS FOR ISSUING OR INVALIDATING DIGITAL ATTRIBUTE CERTIFICATES

(71) Applicant: MAP MY SKILLS LIMITED, Hamilton (NZ)

(72) Inventor: Reza Yaghoubi, Hamilton (NZ)

(73) Assignee: Map My Skills Limited, Hamilton (NZ)

(*) Notice: Subject to any disclaimer, the term of this patent is extended or adjusted under 35 U.S.C. 154(b) by 223 days.

(21) Appl. No.: 18/565,646

(22) PCT Filed: Jun. 3, 2022

(86) PCT No.: PCT/NZ2022/050065
§ 371 (c)(1),
(2) Date: Nov. 30, 2023

(87) PCT Pub. No.: WO2022/255886
PCT Pub. Date: Dec. 8, 2022

(65) Prior Publication Data

US 2024/0273551 A1 Aug. 15, 2024

(30) Foreign Application Priority Data

Jun. 4, 2021 (NZ) ........................................ 776900

(51) Int. Cl.
*G06Q 30/018* (2023.01)
*G06F 21/64* (2013.01)
*G06Q 10/1053* (2023.01)

(52) U.S. Cl.
CPC ......... *G06Q 30/018* (2013.01); *G06F 21/645* (2013.01); *G06Q 10/1053* (2013.01)

(58) Field of Classification Search
None
See application file for complete search history.

(56) References Cited

U.S. PATENT DOCUMENTS

2020/0396089 A1* 12/2020 Guo ...................... H04L 63/123

FOREIGN PATENT DOCUMENTS

CN 110490588 A 11/2019
CN 111814129 A 10/2020
(Continued)

OTHER PUBLICATIONS

International Search Report issued in PCT/NZ2022/050065; mailed Sep. 19, 2022.
(Continued)

*Primary Examiner* — George Chen
(74) *Attorney, Agent, or Firm* — Studebaker Brackett PLLC

(57) ABSTRACT

In one aspect the invention provides a computer readable medium bearing computer readable digital attribute certificate invalidation instructions for a member entity programmable device. These instructions facilitate receipt and presentation of a certification request and evidence information to a member entity, then solicit and transmit a pledge from the receiving member entity to receive an indication determining if the receiving member entity has been identified as a contracted member. If the receiving member entity is identified as a contracted member an assessment report is solicited and transmitted from the member entity. Assessment reports prepared by a number of contracted members are then received and presented to solicit and transmit a certification vote from the receiving member entity. This certification vote is used to determine if an attribute certification is to be issued and stored on a block chain database in response to the received certification request and evidence information.

15 Claims, 4 Drawing Sheets

(56) References Cited

FOREIGN PATENT DOCUMENTS

| | | | |
|---|---|---|---|
| JP | H11-231776 | A | 8/1999 |
| WO | 2020205514 | A1 | 10/2020 |

OTHER PUBLICATIONS

International Preliminary Report On Patentability issued in PCT/NZ2022/050065; mailed Sep. 15, 2023.

Murata, Y. et al., 'Attribute authority functions that enable certifying personal attributes', NTT review, 2002, vol. 14/6, ISSN 0915-2334, pp. 59 to 62.

* cited by examiner

METHOD AND APPARATUS FOR ISSUING OR INVALIDATING DIGITAL ATTRIBUTE CERTIFICATES

FIELD OF THE INVENTION

This invention relates to a system, method and apparatus for issuing or invalidating digital attribute certificates.

BACKGROUND OF THE INVENTION

The ability to certify attributes is valuable to entities such as people, businesses and other forms of organisations.

For example, people seeking employment commonly wish to be able to advertise their skills and have the skills validated by a well-known trusted and independent third party. Workers with uncertainty in uncertified skills have limited mobility, and they find it hard to change jobs or their location because it is hard to prove that they have certain skills. Formal skills certifications such as university or tertiary institute degrees or diplomas are sought after for these reasons.

Employers also find it expensive to search for appropriate candidates for positions that require skilled workers when skills certificates are not available or reliable. Employers have to use more expensive and riskier techniques such as rounds of interviews, practical tests and probationary periods to ensure that a person is fit for a job.

Employers must also be cautious with formal skills certificates issued by third-party educational institutions. A job applicant may have forged a physical document or simply lied about its existence. Similarly corruption and fraudulent behaviour can result in job applicants possessing valid educational certificates and having no relevant skills.

Like people, businesses and organisations can also benefit by holding a certification of one or more attribute they hold. For example, attributes relating to an organisation meeting and exceeding regulatory standards can be a valuable attribute to have certified and publicised. Similarly, an attribute relating to the systems and processes of a business being environmentally friendly or ethically minded would also be valuable to certify and publicise.

In some cases industry or activity focused organisations may be formed by a community of entities involved in the same activities. These industry groups do have the ability to assess other people, businesses or organisations and determine if they possess the attribute required for certification. However such organisations may not be particularly well-known nor function effectively as a trusted third-party.

Various forms of artificial intelligence based systems or agents have also been developed which exhibit or possess a range of attributes. As is the case with people and organisations, the current state of the art does not allow for the certification of various attributes of such machine based artificial intelligence systems.

It would be of advantage to have improvements in the field of attribute certification and invalidation which addressed the above issues or at least provided the public with an alternative choice.

DISCLOSURE OF THE INVENTION

According to one aspect of the present invention there is provided a computer readable medium bearing computer readable digital attribute certificate invalidation instructions for a member entity programmable device, these instructions arrange to execute the steps of:

a. receiving and presenting a certification request and evidence information to a member entity,
b. soliciting and transmitting at least one pledge from the receiving member entity, and receiving an indication determining if the receiving member entity has been identified as a contracted member
c. if the receiving member entity is identified as a contracted member soliciting and transmitting at least one assessment report prepared by the receiving member entity,
d. receiving and presenting assessment reports prepared by contracted members to the receiving member entity,
e. soliciting and transmitting a certification vote from the receiving member entity to determine if an attribute certification is to be issued and stored on a block chain database in response to the received certification request and evidence information.

According to a further aspect of the present invention there is provided a computer readable medium bearing computer readable digital attribute certificate issue and distribution instructions for a processing platform including at least one programmable device, these instructions arranged to execute the steps of:

receiving a certification request from a candid entity, the request being associated with or accompanied by evidence information, distributing the request and evidence information to a plurality of member entities receiving pledges from at least one member entity and identifying a subset of contracted members drawn from the plurality of member entities based on the pledge or pledges received receiving assessment reports from each contracted member and communicating the received assessment reports to the plurality of member entities receiving certification votes from the plurality of member entities and creating at least one attribute certificate based on the votes received storing the attribute certificate on a block chain database According to another aspect of the present invention there is provided a method of issuing and distributing a digital attribute certificate characterised by the steps of:

receiving a certification request from a candid entity, the request being associated with or accompanied by evidence information, distributing the request and evidence information to a plurality of member entities receiving pledges from at least one member entity and identifying a subset of contracted members drawn from the plurality of member entities based on the pledge or pledges received receiving assessment reports from each contracted member and communicating the received assessment reports to the plurality of members receiving certification votes from the plurality of members and creating at least one attribute certificate based on the votes received storing the attribute certificate on a block chain database According to a further aspect of the present invention there is provided an apparatus forming a processing platform for issuing and distributing a digital attribute certificate, the processing platform including at least one programmable device programmed with computer readable digital attribute certificate issue and distribution instructions which are configured to implement a method of issuing and distributing a digital attribute certificate substantially as described above.

According to a yet further aspect of the present invention there is provided a computer readable medium bearing computer readable digital attribute certificate invalidation instructions for a member entity programmable device, these instructions arrange to execute the steps of:

i. receiving and presenting to a member entity a fraud report and complaint data specifying or identifying an attribute certificate stored on a block chain database,
ii. soliciting and transmitting at least one pledge from the receiving member entity and receiving an indication determining if the receiving member has been identified as a prosecution member or a defensive member,
iii. if the receiving member entity is identified as either a prosecution member or a defensive member soliciting and transmitting at least one validity report prepared by the receiving member entity,
iv. receiving and presenting validity reports prepared by prosecution and defensive members to the receiving member entity,
V. soliciting and transmitting a validity vote from the receiving member entity to determine if at least one corrective action is to be executed on the attribute certificate in response to the received fraud report and complaint data.

According to another aspect of the present invention there is provided a computer readable medium bearing computer readable digital attribute certificate invalidation instructions for a processing platform including at least one programmable device, these instructions arrange to execute the steps of:

receiving a fraud report from a reporting entity, the fraud report being associated with or accompanied by complaint data specifying or identifying an attribute certificate distributing the report and complaint data to a plurality of member entities receiving pledges from at least one member entity and identifying a subset of at least one prosecution member and at least one defensive member drawn from the plurality of member entities based on the pledges received, receiving validity reports from each of the prosecution and defence members and communicating the received reports to the plurality of members receiving validity votes from the plurality of members and identifying at least one corrective action based on the received votes, Executing the identified corrective action or actions on the attribute certificate stored on the block chain database.

According to a further aspect of the present invention there is provided a method of invalidating a fraudulent attribute certificate stored with a block chain database, characterised by the steps of receiving a fraud report from a reporting entity, the fraud report being associated with or accompanied by complaint data specifying or identifying an attribute certificate distributing the report and complaint data to a plurality of member entities receiving pledges from at least one member entity and identifying a subset of at least one prosecution member and at least one defensive member drawn from the plurality of member entities based on the pledges received, receiving validity reports from each of the prosecution and defence members and communicating the received reports to the plurality of members receiving validity votes from the plurality of members and identifying at least one corrective action based on the received votes, Executing the identified corrective action or actions on the attribute certificate stored on the block chain database.

According to a another aspect of the present invention there is provided an apparatus forming a processing platform for invalidating a digital attribute certificate which includes at least one programmable device programmed with computer readable digital attribute certificate invalidation instructions which are configured to implement a method of invalidating a digital attribute certificate substantially as described above.

The present invention relates to a method, apparatus and computer executable instructions configured to issue or invalidate digital attribute certificates. Those skilled in the art will appreciate that various aspects of the invention allow for both the issuing and invalidation of digital attribute certificates, or the issuing or invalidation of digital attribute certificates in isolation. Various aspects of the invention also relate to methods of issuing or invalidating such digital attribute certificates, computer executable instructions configured to implement such methods, and apparatus implemented by programmable devices loaded with such computer executable instructions.

Reference throughout this specification will predominantly be made to the invention executing the steps of a method utilising a programmable device. Programmable devices which may be utilised in conjunction with the present invention may also vary, and range from—for example—dedicated server equipment, desktop or laptop personal computers, and tablet devices through to smart phones. Those skilled in the art will however appreciate that the invention encompasses other aspects within its scope and reference to the above should in no way be seen as limiting.

In particular, reference throughout this specification has been made to the invention providing executable instructions for use with or by a member entity programmable device and a processing platform including at least one programmable device. This member entity programmable device may be provided by a personal computer, laptop, smart phone, tablet computer or any similar programmable device available to member entities using the invention in various embodiments. A processing platform may be implemented by a single programmable device in some embodiments, or an array of devices functioning as a network, or through use of cloud computing facilities in yet other embodiments. Those skilled in the art will appreciate that a wide range of hardware configurations can be utilised to implement the processing platform provided in accordance with the invention.

Those skilled in the art will appreciate that the invention may utilise well known information technology tools, libraries and techniques in the implementation of the invention. In particular, references made throughout this specification to the transmission and reception of various forms of data and information will be readily understood by those skilled in the art as being implemented by any applicable form of well-known internet based technologies. Similarly the solicitation and presentation of data and information using a member entity programmable device will be understood by those skilled in the art as being implemented by any applicable form of well-known user interface based technologies.

The present invention also utilises block chain technology to store digital attribute certificates. Block chain technology implements a distributed database composed from individual programmable device nodes, all of which store the same instances of information or data committed to a specific block chain.

A variety of the steps or operations executed in conjunction with the invention relate to the communication, distribution or receipt of various messages, information or data. Those skilled in the art will appreciate that well known internet technology may be used to facilitate such communications, and the communication protocol used will be determined by the network architecture and design employed. In particular embodiments the individual programmable device nodes making up a block chain distributed database can be utilised to communicate, distribute or receive such messages, information or data. In other embodiments a centralised architecture may be employed with a single programmable device facilitating the communications required to implement the invention.

Those skilled in the art will appreciate that the specific equipment, apparatus or hardware on which the executable instructions provided by the invention are run can vary substantially in different embodiments. Reference throughout this specification will be made in general terms to a single computer system or programmable device receiving or transmitting such communications and subsequently executing any actions required to update a specific block chain database. Again those skilled in the art will however appreciate that alternative implementations and system architectures may be employed in a range of different embodiments.

The present invention facilitates the collaboration of a group of entities to issue or invalidate digital attribute certificates. An entity which can engage with the methodology of the invention may consist of a single person, a group of people (such as a business or other forms of organisations), an artificial intelligence software agent or group of such software agents, or any applicable permutation or combination of same. Any of the above types of entities may therefore act as a member entity in accordance with the invention. The invention allows entities which possess or exhibit one or more specific attributes to form a community, and for these community members to issue or invalidate digital attribute certificates which are related to the attribute or attributes which the members of this community have in common.

In preferred embodiments the invention facilitates the issuing of one or more digital attribute certificates. Such certificates are commonly used and well known in the prior art for establishing identity and to prove ownership of a public key/private key pair. The same approach may be utilised by the invention to issue a digital certificate which relates to a particular attribute of an entity and is specific to that entity holding a related private key/public key pair.

The present invention may be used to issue or invalidate digital attribute certificates related to a range of attributes which can be held or exhibited by an entity. Various examples of attributes which may be related to certificates can include:

- a skill or skills possessed by an entity
- specific knowledge held by an entity
- the meeting of standards of behaviour or conduct by an entity
- the possession of specific physical or intangible resources by an entity
- the successful completion of an assessment process by an entity
- the entity meeting or exceeding a threshold performance measurement of an activity or task,
- the entity possessing the ability to (preferably accurately) assess one or more attributes of other entities.

For example, in various embodiments the invention may find specific utility in applications where the skills held by a person are not certified or documented by a trusted and independent third-party. In such applications an attribute or attributes assessed in conjunction with the invention can be the skill of relevance to this person, with the invention being used to issue an appropriate digital attribute certificate if the person is determined to possess this skill.

In other embodiments the attribute assessed in conjunction with the invention may be that of a business or organisation meeting or exceeding the standards of a professional or certification body.

In yet other embodiments the attribute assessed may be an artificial intelligence software agent's training to identify specific patterns in a dataset and being able to meet a threshold accuracy measurement for pattern recognition.

In yet further embodiments the attribute considered may be an entity's ability to assess other entities possession of one or more specific attributes which are the focus of a community of entities which work together to utilise the invention. In such embodiments the attribute being considered is the entity's suitability for membership in such a community, as discussed further below.

Those skilled in the art will therefore appreciate that the invention may be utilised in a wide range of applications to assess and recognise the possession of a multitude of different attributes by various entities.

As indicated above in one aspect the invention can be utilised to issue digital attribute certificates. The invention allows a community of member entities to assess a candidate entity's suitability for receiving a digital attribute certificate. These member entities preferably qualify as community members by possessing their own digital attribute certificates which attest to their ability to assess one or more specific attributes of a candidate entity.

Prospective member entities can therefore start as candidate entities and seek the issue of a digital attribute certificate which qualifies them for membership of a particular community by being able to assess other entities possession of the attributes of relevance or interest to this community. Other candid entities may also seek attribute certificates which do not necessarily qualify them for membership to the related community but instead simply attest to their possession of a particular attribute.

The present invention can therefore facilitate the creation and growth of a community of entities with a common set of attributes and preferably having common goals or being involved with common activities. This type of community can therefore become well known for its expertise in respect of particular attributes, and through the use of the invention become known as a trusted third-party certifier of related attributes. In various embodiments the communities which the invention supports may be open to any entities which possess the attribute or attributes required to assess other candidate entities.

In preferred embodiments the method implemented by the invention to issue a digital attribute certificate is started by the receipt of a certification request from a candidate entity. The candidate entity also accompanies its certification request with evidence information.

The evidence information accompanying a certification request provides the information required to determine if a candidate entity possesses the relevant attribute associated with the certificate being sought. Such evidence information may—for example—include;

photographs, video or other records related to work product example produced by the candidate entity reports of inspections undertaken of a premises or assets, preferably being that of the candidate entity, the results of third party assessments completed by the candidate entity testimonial evidence from third parties related to the possession of the specific attribute by the candidate entity attestation evidence from third party entities that any other evidence information is produced by or related to the candidate entity.

The certification request identifies a particular attribute which the candidate entity wishes to receive a digital attribute certificate for. The identity of the related attribute certificate may be associated with a particular assessment framework outlining how the received evidence information is to be considered in determining whether the candidate possesses the related attribute. Alternatively identity information related to a particular assessment framework may be explicitly incorporated into the candidate's certification request.

In various preferred embodiments a certification request may also incorporate or be accompanied by an amount of digital concurrency or otherwise provide credit for an amount of traditional currency. The currency associated with a certification request can ultimately be disbursed in accordance with the invention to member entities for their efforts in assessing the related attribute or attributes of the candidate entity.

On receipt of a valid certification request the invention can then act to distribute the certification request and associated evidence information to a plurality of member entities. As indicated above, these member entities possess or have previously had issued to them attribute certificates which identify that they had the ability to assess other candidate entity's possession of the attributes of relevance or interest to this community. Member entities can use the received certification request and evidence information to determine if they wish to participate in assessing whether the candidate entity possesses the attribute associated with the certificate they have requested.

After distribution of the certification request and evidence information the invention acts to receive pledges from at least one member entity. These pledges indicate that the transmitting member entity is interested in participating in assessing whether the candidate entity possesses the attribute associated with the certificate requested. Pledges provided by entities can act as collateral to ensure the good faith behaviour of member entities during the assessment of candidate entities. In preferred embodiments a member entity is incentivised to submit pledges through the prospect of receiving a share of the currency submitted by the candidate entity in combination with their certification request.

In a preferred embodiment pledges received from member entities can include or identify at least one digital attribute certificate awarded or associated with a respective member entity. This attribute certificate or certificates can provide evidence that the candidate submitting the pledge is appropriately qualified to assess the possession of the respective attribute by the candidate entity. In further preferred embodiments any pledged digital attribute certificate may also be subject to a corrective action in the event of the determination of the member entity acting fraudulently in the assessment of the candidate entity.

In a preferred embodiment pledges received from member entities may also incorporate or are accompanied by an amount of digital currency or otherwise provide credit for an amount of traditional currency. The currency associated with a pledge could be subject to forfeiture in the event of a determination that the member entity acted fraudulently in the assessment of the candidate.

In various embodiments pledges received from member entities may also indicate the entity's initial belief that an attribute certificate should or should not be issued to the candidate entity.

The pledges received from entities may be used by the invention to identify a subset of contracted members drawn from the plurality of member entities which received the certification request. This identification process may be completed in various ways in different embodiments.

For example in some embodiments where pledges incorporate or are associated with a particular value of currency, this subset of contracted members may be identified from a fixed number of members who have pledged the largest currency values. In yet other embodiments where pledges incorporate or associated with an attribute certificate of a member entity, this group of contracted members may be selected using the pledges which have the largest numbers of associated attribute certificates, or attribute certificates indicating a high level of expertise in the assessment of the particular attribute for which the candidate seeks certification. In yet other embodiments contracted entities may be identified through assessing both a combination of pledged currency and tribute certificates depending on the make-up and desires and of the related community of member entities.

In some embodiments the subset of contracted members may be identified so as to contain one or more member entities whose pledges identified an initial belief that an attribute certificate should not be issued, and one or more member entities whose pledges identified an initial belief that an attribute certificate should be issued. The identified contracted members will therefore present opposing views arguments and supporting evidence as part of their participation and the assessment process provided by the invention.

Once the required subset of contracted entities has been identified the apparatus employed by the invention awaits and subsequently receives an assessment report from each of these contracted members. An assessment report is drawn up by a contracted entity on the basis of an assessment framework defined for the attribute certificate being sought and the received evidence information. The assessment framework provides guidance and instructions to the contracted entity on how the received evidence information is to be assessed and also preferably on the format, structure and contents of the assessment report to be delivered by the contracted entity.

For example in various embodiments an assessment report may incorporate the following information derived from a candid entity's received evidence information:

text, photographs, video or other records related to a related assessment framework produced by a member entity reports of inspections undertaken of a candidate entities premises or assets by a member entity testimonial evidence from third parties related to the possession of the attribute of interest by the candidate entity attestation evidence from third party entities that a related assessment framework has been followed and that an assessment report is produced by the contracted entity The received assessment reports are then distributed by the invention to a plurality-member entities of the community which received the request to issue an attribute certificate. For example some embodiments all members of the community of member entities may receive these assessment reports. In other embodiments the plurality of member entities who receive these assessment reports may be a subset of delegated decision-making member entities. Those skilled in the art will appreciate that such communities are able to organise or define which of their members receive and act on these assessment reports.

The receiving member entities use the received assessment reports to determine if they agree that the candidate entity possesses the related attribute for which the certificate is sought. Each receiving member entity then transmits a certification vote which identifies their decision on issuing the attribute certificate to the requesting candidate entity.

These certification votes are received and collated by the apparatus employed in conjunction with the invention and used to determine if one or more attribute certificates are to be created and associated with the candidate entity. In various embodiments a simple majority of positive certification votes may result in the creation of an attribute certificate, whereas in other embodiments higher proportion—such as two thirds or three quarters—of the certification votes must be positive for an attribute certificate to be issued. Those skilled in the art will appreciate that the members of the specific community from which the attribute certificate is sought can determine the criteria or rules for the required positive certification votes to issue attribute certificates.

In various embodiments the resolution of the decision to issue or not to issue an attribute certificate can also trigger the transfer of the currency provided by a candidate entity to one or more contracted entities which assessed their related evidence information. For example in further embodiments where contracted entities are selected based on both their initial approval and disapproval of issuing a certificate to a candidate entity, this currency may be transferred only to the contracted entities which won the related vote for either issuing or not issuing the requested certificate.

The invention is configured so that any issued certificate is stored after issue on a block chain database. Block chain databases provide a mechanism for distributing the same information redundantly across a number of distinct computing device notes, with each block created in the chain data structure rendering the prior block inviolate and non-editable. Once integrated into the block chain the issuing of the digital attribute certificate cannot be refuted. Furthermore the information making each block of a chain may also be made accessible to any interested party, or any appropriate authorised party. In this way block chain technology can be utilised with the invention to store and provide access to digital attribute certificates which are issued by a trusted community of entities known for their expertise in the attribute attested to by such certificates.

In a number of embodiments a new block incorporating a newly issued certificate may also include any of the information and communications handled by the invention in the execution of its method of issuing and distributing this digital attribute certificate. For example, in some embodiments any combination or permutation of certification requests, evidence information, member pledges, assessment reports and/or certification votes may also be committed to a block which incorporates a newly issued digital attribute certificate. In yet other embodiments a block containing a newly issued digital attribute certificate may include a reference, pointer or address to a further digital storage location or facility which can provide access to any combination or permutation of the above information.

In various embodiments of the invention also implements a method, system apparatus and computer executable instructions for the invalidation of digital attribute certificates.

In preferred embodiments the method implemented by the invention to invalidate a digital certificate is started by the receipt of a fraud report from a reporting entity. Preferably this reporting entity may be any interested party who has discovered or believes that a previously issued digital attribute certificate has been issued on the basis of fraudulent activity. In various embodiments the fraudulent activity considered and made the subject of a fraud report may—for example—be deliberate, accidental or the result of negligence.

This fraud report is preferably associated with or accompanied by complaint data which specifies or identifies a particular digital attribute certificate which the reporting entity asserts is invalid.

The complaint data accompanying a fraud report provides the information required to determine if the identified attribute certificate is invalid. Such complaint data may—for example—include;

- Identities of reporting entities, details of any associated pledges, and other information supporting credibility of the fraud report
- Identities of the allegedly fraudulent certificate(s) and any entities who own the certificate(s) or were associated with the issue of the certificate(s)
- Text, photographs, video or other records to put forward a statement that alleges one or more attribute certificates to be fraudulent and/or one or more of the associated entities of fraud with attachments to support their report—which could for example include;
  - information showing that the evidence information provided by the candidate did not meet an assessment framework of the community when the certificate was issued
  - information showing that the evidence information was not produced by the associated candidate entity including plagiarised, borrowed or purchased evidence information
  - information showing that the evidence information was not assessed by the associated contracted member entity or entities
  - Testimonial or attestation information showing that any part of an assessment framework associated with the issued certificate was skipped or neglected by a candidate or at least one member entity
  - Justification arguments explaining why the accusation of fraud is brought forward
  - Reports collated to discover similar fraud patterns by a candidate entity, member entity or plurality of member entities
  - Information relating to the background or history of the candidate entity, the member entity or entities and the reporting entity The identity of the alleged invalid certificate can also be used to retrieve or identify an assessment framework outlining how the received complaint data is to be considered in determining whether the identified attribute certificate is invalid.

In various preferred embodiments a fraud report may also incorporate or be accompanied by a pledge from the reporting entity. This pledge can function as collateral to ensure the good faith behaviour of any reporting entities.

In some embodiments where a pledge is provided in combination with a fraud report the pledge may incorporate an amount of digital concurrency or otherwise provide credit for an amount of traditional currency. The currency associated with a fraud report can be subject to forfeiture in the event that the identified digital certificate is found to be valid.

In some embodiment pledges received from reporting entities can include or identify at least one digital attribute certificate awarded to or associated with a respective reporting entity. This attribute certificate or certificates can provide evidence related to the reputation of the reporting entity or history in the submission of prior fraud reports. In some instances—for example—fraud reports may only be accepted from reporting entities able to pledge a certificate which shows a threshold track record of prior successful identification of fraudulent certificates.

On receipt of a fraud report the invention will act to distribute the report and associated complaint data to a plurality of member entities. Member entities can use the received report and associated complaint data to determine if they wish to participate in assessing if the identified attribute certificate is invalid.

After distribution of the fraud report and associated complaint data the invention acts to receive pledges from at least one member entity. These pledges indicate that the transmitting member entity is interested in participating in assessing whether the identified attribute certificate is invalid. Again pledges provided by entities can act as collateral to ensure the good faith behaviour of member entities during this assessment process.

In preferred embodiments such pledges may also indicate whether the submitting member entity has an initial belief that the identified certificate is valid or invalid, and therefore if the member wishes to prosecute or defend the certificate.

In various embodiments pledges received in response to the distribution of a fraud report can include or identify at least one digital attribute certificate awarded to or associated with a respective member entity. This attribute certificate or certificates can provide evidence that the member submitting the pledge is appropriately qualified to assess the validity of the identified attribute certificate. In further preferred embodiments any pledged digital attribute certificate may also be subject to a corrective action in the event of the determination of the member entity acting fraudulently in the assessment of the validity of the identified attribute certificate.

Furthermore in various embodiments pledges received in respect of a fraud report may incorporate or be accompanied by an amount of digital currency or otherwise provide credit for an amount of traditional currency. The currency associated with a pledge could be subject to forfeiture in the event of a determination that the member entity acted fraudulently in the assessment of the validity of the identified attribute certificate.

The pledges received from member entities may be used by the invention to identify a subset of prosecution and defensive members drawn from the plurality of member entities which received the fraud report. Preferably each received pledge also identifies a member's preference for being nominated as a prosecution member or a defence of member. This identification process may be completed in various ways in different embodiments for each set of prosecution and defensive members to be identified.

In some embodiments where pledges incorporate or are associated with a particular value of currency, these two subsets of members may be identified from a fixed number of members who have pledged the largest currency values. In yet other embodiments where pledges incorporate or are associated with an attribute certificate of a member entity, the groups of prosecution and defensive members may each be selected using the pledges which have the largest numbers of associated attribute certificates, or attribute certificates indicating a high level of expertise in the assessment of the alleged fraudulence of the identified attribute certificate. In yet other embodiments the prosecution and defensive entities may be identified through assessing both a combination of pledged currency and attribute certificates depending on the make-up and desires of the related community of member entities.

Once the required subsets of prosecution and defensive entities have been identified the apparatus employed by the invention awaits and subsequently receives a validity report from each of these prosecution and defensive entities. A validity report is drawn up by each respective entity on the basis of an assessment framework defined for the alleged invalid attribute certificate and the received complaint data. The assessment framework provides guidance and instructions to the prosecution and defensive entities on how the received complaint data is to be assessed and also preferably on the format, structure and contents of the validity report which is to be delivered.

For example in various embodiments a validity report may incorporate the following information derived from a received complaint data:

Prosecution Reports—

Identity information linking the report to an original fraud report and associated complaint data Identities of reporting entities, details of any associated pledges, and other information supporting credibility of the fraud report Identities of the allegedly fraudulent certificate(s) and any entities who own the certificate(s) or were associated with the issue of the certificate(s)

information that the evidence information provided by the candidate did not meet a related assessment framework of the community at time of the assessment information that the evidence information was not produced by the associated candidate entity including plagiarised, borrowed or purchased evidence information information that the evidence information was not assessed by the associated contracted member entity or entities Testimonial or attestation information showing that any part of an assessment framework associated with the issued certificate was skipped or neglected by a candidate or at least one member entity Justification arguments explaining why the accusation of fraud is brought forward Reports collated to discover similar fraud patterns by a candidate entity, member entity or plurality of member entities Information relating to the background or history of the candidate entity, the member entity or entities and the reporting entity Defensive Reports—

Identity information linking the report to an original fraud report and associated complaint data Any information or arguments that invalidate the original fraud report and/or any of the information incorporated within a prosecution report or related complaint data.

In some embodiments the prosecution and/or defensive entities may also prepare and supply multiple validity reports. For example, in some embodiments secondary or tertiary reports may also be provided in response to a counterpart's validity report to rebut or argue against assertions made in this counterpart's report. In this way the invention may in some embodiments allow prosecution and defensive entities to rebut arguments and assertions made by their counterparts.

The received validity reports are then distributed by the invention to a plurality—or preferably all—member entities of the community which received the original fraud report. The receiving member entities use the received validity reports to determine if they agree that the identified attribute certificate is valid or invalid. By utilising separate teams of prosecution and defensive entities to generate validity reports, the receiving members are able to consider a range of arguments and supporting evidence in support of invalidation or defending against invalidation.

Each receiving member entity then transmits a validity vote which communicates their decision on the validity of the identified attribute certificate. These validity votes are received and collated by the apparatus employed in conjunction with the invention and used to determine if the identified attribute certificate is to be treated as invalid. Again in various embodiments a simple majority of negative validation votes may result in further action being taken in respect of the identified attribute certificate, whereas in other embodiments higher proportions—such as two thirds or three quarters—of negative validation votes must be received for an attribute certificate to be treated as invalid. Those skilled in the art will appreciate that the members of the community assessing the validity of the attribute certificate can determine the criteria or rules for the required negative validity votes to treat a certificate as invalid.

If a previously issued attribute certificate is deemed to be invalid by the received validity votes at least one corrective action is identified by the apparatus of the invention. At least one form of such a corrective action can be executed or taken in respect of the identified invalid attribute certificate stored on a block chain database.

For example in some embodiments a sub-block may be committed to the block chain originally storing the invalidated certificate, this sub-block incorporating a notification that the previously issued digital attribute certificate has now been deemed to be invalid. This corrective action allows interested parties to both identify that the original attribute certificate has been stored on a block, and by traversing the chain through to its current block determine if the same certificate has subsequently been invalidated.

Furthermore in additional embodiments a register may also be maintained of invalidated attribute certificates, this register being stored independent of the block chain database used to store the certificate. In such embodiments this register may be configured as a public domain or publicly accessible resource which can be used by any third parties to check the validity of a digital attribute certificate.

In a number of additional embodiments a new block incorporating a newly issued invalidation notification may also include any of the information and communications handled by the invention in the execution of its method of invalidating this fraudulent digital attribute certificate. For example, in some embodiments any combination or permutation of fraud reports, complaint data, member pledges, validity reports and/or validity votes may also be committed to a block which incorporates a newly issued certificate invalidation notification. In yet other embodiments a block containing a newly issued certificate invalidation notification may include a reference, pointer or address to a further digital storage location or facility which can provide access to any combination or permutation of the above information.

In yet other embodiments a variety of different forms of corrective actions may be taken once a previously issued attribute certificate is deemed to be invalid. Such corrective actions may be undertaken in respect of pledges made by any original contracted entity who was involved with or instrumental in arriving at the original decision to issue the related attribute certificate. Pledges originally provided by such contracted entities can be utilised to sanction the related contracted entity through additional corrective actions. For example, in some embodiments a corrective action may be executed which transfers the currency pledged by culpable contracted entities to either or both the reporting entity or prosecuting member. In yet other embodiments corrective actions may also be taken in respect of any digital attribute certificates pledged by the culpable contracted entity by issuing a further certificate invalidation notification in respect of this member's pledged attribute certificate or certificates.

The present invention may provide many potential advantages over prior art.

In various embodiments the invention provides a mechanism for assessing a candidate entity's possession of various attributes, and for certification of these attributes by an independent and appropriately skilled community of experts. This certification can be recorded and published using a block chain database which provides certification information to third parties as required.

In various embodiment of the invention provides a mechanism for invalidating fraudulent digital attribute certificates. In such embodiments the invention allows previously issued attribute certificates to be investigated, and again for the invalidity of certificates to be recorded and published for third party access using a block chain database.

In various embodiments the invention may also provide its users a mechanism of currency exchange for services rendered, while also holding collateral offered by these users as security against fraudulent behaviour. This aspect of the invention allows skilled communities of experts to build public trust in their attribute certification and publication services. Furthermore through the provision of a mechanism to invalidate fraudulent digital attribute certificates third party reporting entities are incentivised to report any potentially invalid and fraudulently obtained attribute certificates. This facility again increases public trust and the validity of digital attribute certificates issued by such a community.

BRIEF DESCRIPTION OF THE DRAWINGS

Additional and further aspects of the present invention will be apparent to the reader from the following description of embodiments, given in by way of example only, with reference to the accompanying drawings in which.

Further aspects of the invention will become apparent from the following description of the invention which is given by way of example only of particular embodiments.

BEST MODES FOR CARRYING OUT THE INVENTION

Figure 1:
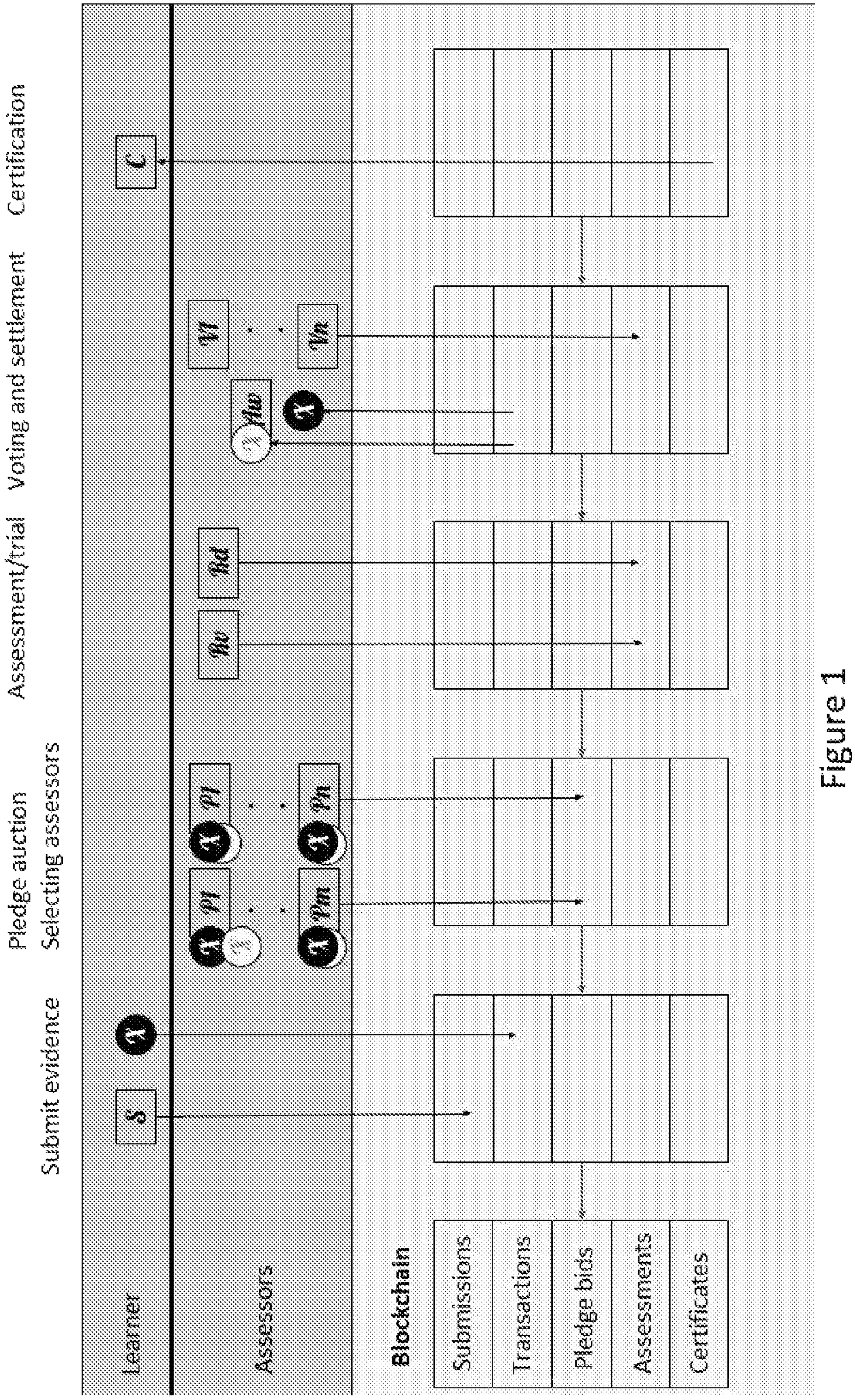
FIG. 1 provides a diagrammatic illustration of steps executed in a method of issuing digital attribute certificates provide in accordance with one embodiment, FIG. 2 provides a diagrammatic illustration of steps executed in a method of invalidating fraudulent digital attribute certificates provided in accordance with the embodiment of FIG. 1, FIG. 3 provides a diagrammatic illustration of steps executed in a method of issuing digital attribute certificates provide in accordance with a further embodiment, FIG. 4 provides a diagrammatic illustration of steps executed in a method of invalidating fraudulent digital attribute certificates provided in accordance with the embodiment of FIG. 3.

FIG. 1 provides a diagrammatic illustration of steps executed in a method of issuing digital attribute certificates provide in accordance with the one embodiment. This figure sets out the steps executed by this method by illustrating the information transmissions received or provided by the invention relative to a block chain data structure used to record this information.

The following symbols are used in FIG. 1, as discussed further below:

| | | | |
|---|---|---|---|
| | Submission | | Approval report |
| | Digial currency value | | Disapproval roport |
| | Pledge | | Winning Assessor |
| | Voter | | Pledged attribute certificate |
| | Certificate of skill | | |

The first step of the method shown is triggered by the receipt of a certification request from a learner or candidate entity, this request being accompanied by an amount of digital currency. The certification request incorporates evidence information which is to be used to determine if the candidate possesses a specific attribute and therefore if a related attribute certificate can be issued. At this step the certification request and evidence information is stored in the sub-block Submission, and the candid entity's digital currency is stored in the Transactions sub-block. The receipt and availability of the certification request and evidence information is then communicated to all member entities of a community which acts to issue the digital attribute certificate sought by the candidate entity.

The next step of the method illustrated shows the receipt of pledges from a plurality of member entities of the community from which the digital attribute certificate is being sought. Each of these pledges identifies whether the transmitting member entity initially believes the candidate entity should have the requested attribute certificate issued to them. In addition each pledge nominates a value of digital currency which the transmitting member entity provides as collateral for their participation in the related attribute assessment process. Pledges received at this step also include reference to at least one digital attribute certificate which confirms the member entity's qualification to assess the certification request made by the candidate entity.

These pledges are stored in the sub-block Pledge bids and used by the apparatus provided by the invention to select a pair of contracted entities or Assessors, one being initially approving of the issue of the certificate and the second initially disapproving of the issue of the certificate. In the embodiment shown these two entities are selected on the basis of their communicated preference for issuing a certificate to the candidate entity and by having bid the highest value of digital currency in their pledge.

The following step of this method is executed once each of the contracted entities prepares and provides an assessment report based on their detailed examination of the evidence information accompanying the certification request. Each of these assessment reports is stored in the sub-block Assessments and also communicated to all member entities of the community which is to issue the certificate requested.

The next step of this method is executed on receipt of a certification vote from each member entity which received the pair of assessment reports. Certification votes indicate each member's preference for issuing or refusing to issue a digital attribute certificate to the candid entity. In the embodiment shown a simple majority of positive votes for issuing the certificate will result in a determination being made that the attribute certificate sought should be issued, triggering the release of the digital currency which accompanied the certification request to the contracted entity who advocated for the issue of the certificate. As indicated above this digital currency is stored in then released from the Transactions sub-block. Conversely if the certification votes received indicate an attribute certificate should not be issued to the candid entity the digital currency which accompany the certification request is issued to the contracted entity who advocated against the issue of the certificate.

After this determination has been made issuing of the requested attribute certificate the next step of this method is completed. If insufficient positive certification votes were received in the prior step no certificate is generated and stored at the sub-block certificates. If sufficient positive certification votes were received in the prior step a certificate is generated in association with the candidate entity and is stored at the sub-block Certificates. Once this sub-block is updated appropriately the entire block is then in its final form and is communicated to a block chain database associated with the community of member entities.

Figure 2:
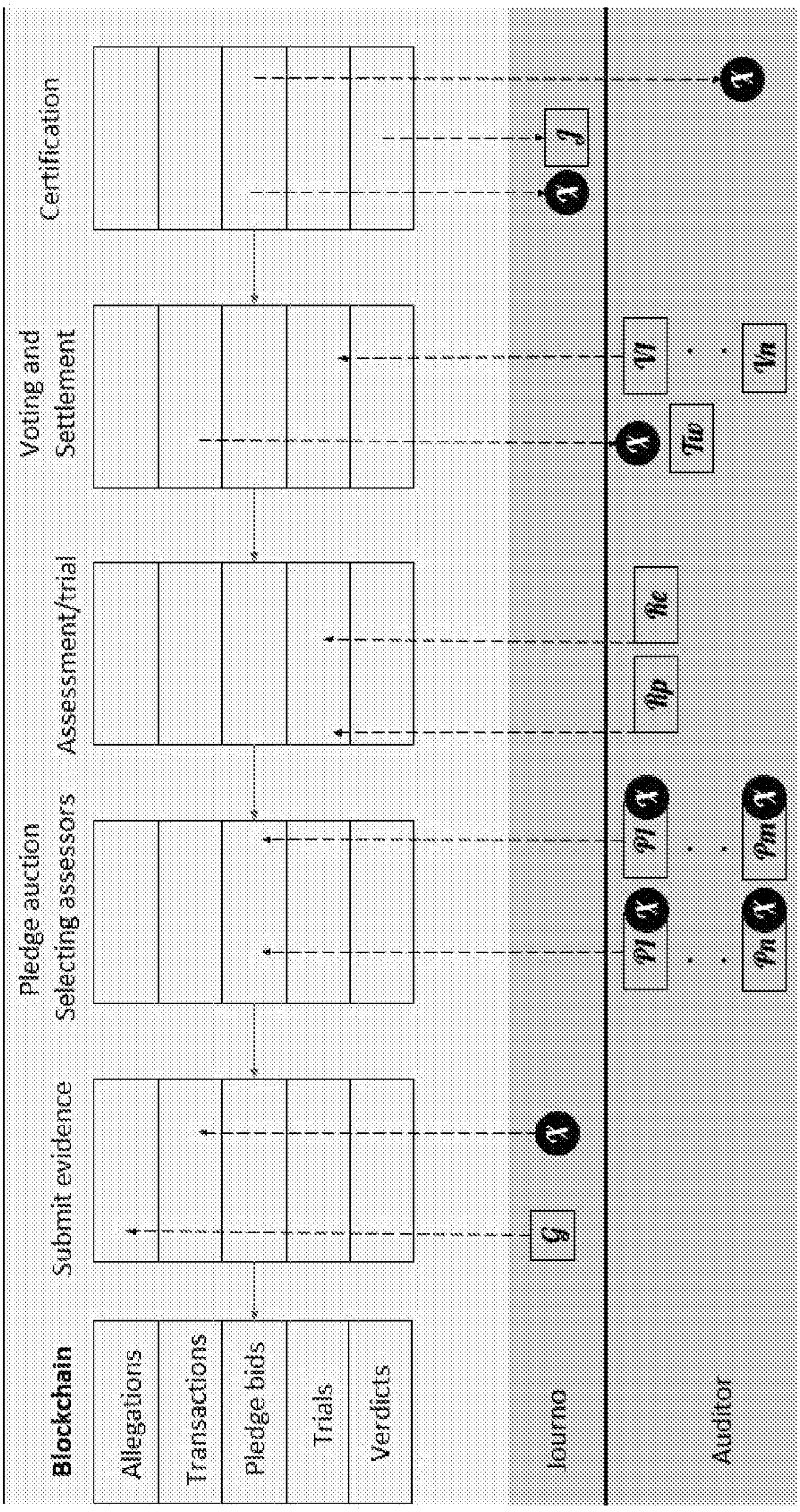

FIG. 2 provides a diagrammatic illustration of steps executed in a method of invalidating a fraudulent digital attribute certificate provided in accordance with a further embodiment. This figure again sets out the steps executed by this method by illustrating the information transmissions received or provided by the invention relative to a block chain data structure used to record this information.

The following symbols are used in FIG. 2, as discussed further below:

| | | | |
|---|---|---|---|
| | Fraud allegation | | Prosecution report |
| | Digital currency value | | Defence report |
| | Pledge | | Winning auditor |
| | Voter | | Journo |

The first step of the method shown is triggered by the receipt of a fraud report from a reporting entity or 'Journo', this request being accompanied by an amount of digital currency. The fraud report incorporates complaint data which is to be used to determine if an attribute certificate identified in the fraud report is invalid. At this step the fraud report and complaint data is stored in the sub-block Allegations, and the reporting entity's digital currency is stored in the Transactions sub-block. The receipt and availability of the fraud report and complaint data is then communicated to all member entities of a community which acted to issue the identified digital attribute certificate.

The next step of the method illustrated shows the receipt of pledges from a plurality of member entities of the community which received the fraud report. Each of these pledges identifies whether the transmitting member entity initially believes the identified attribute certificate is valid or invalid. In addition each pledge nominates a value of digital currency which the transmitting member entity provides as collateral for their participation in the validity assessment process. Pledges received at this step also include reference to at least one digital attribute certificate which confirms the member entity's qualification to assess the validity of the identified attribute certificate based on the received complaint data.

These pledges are stored in the sub-block pledge bids and used by the apparatus provided by the invention to select auditors in the form of a prosecution entity which initially believes the identified attribute certificate is invalid, and a defensive entity which initially believes the identified attribute certificate is valid. In the embodiment shown these two entities are selected on the basis of their communicated preference for validating or invalidating the identified attribute certificate and by having bid the highest value of digital currency in their pledge.

The following step of this method is executed once both the prosecution and defensive members prepares and provides a validity report based on their detailed examination of the complaint data accompanying the fraud report. Each of these validity reports is stored in the sub-block Trials and also communicated to all member entities of the community which issued the identified attribute certificate.

The next step of this method is executed on receipt of a validity vote from each member entity which received the pair of validity reports. These validity votes are stored in the trials sub-block. Validity votes indicate each member's preference for validating or invalidating the identified digital attribute certificate.

In the embodiment shown a simple majority of positive votes for invalidating the certificate will result in a determination being made that the attribute certificate should be invalidated, triggering the release of the digital currency which accompanied the fraud report to the prosecution entity. Conversely if the validity votes received indicate an attribute certificate is valid the digital currency which accompany the fraud report is issued to the defensive entity.

After this determination has been made on the validity of the identified attribute certificate the next step of this method is completed. If insufficient negative validity votes were received in the prior step no further changes are made to the block data. If sufficient negative validity votes were received in the prior step a certificate invalidation notice is generated in association with the original digital attribute certificate and is stored at the sub-block Verdicts. This action also triggers the release to the reporting entity and the prosecution entity of any digital currency associated with pledges made by contracted entities which advocated for the original issue of the certificate. Once the Verdicts sub-block is updated appropriately the entire block is then in its final form and is communicated to a block chain database associated with the community of member entities.

Figure 3:
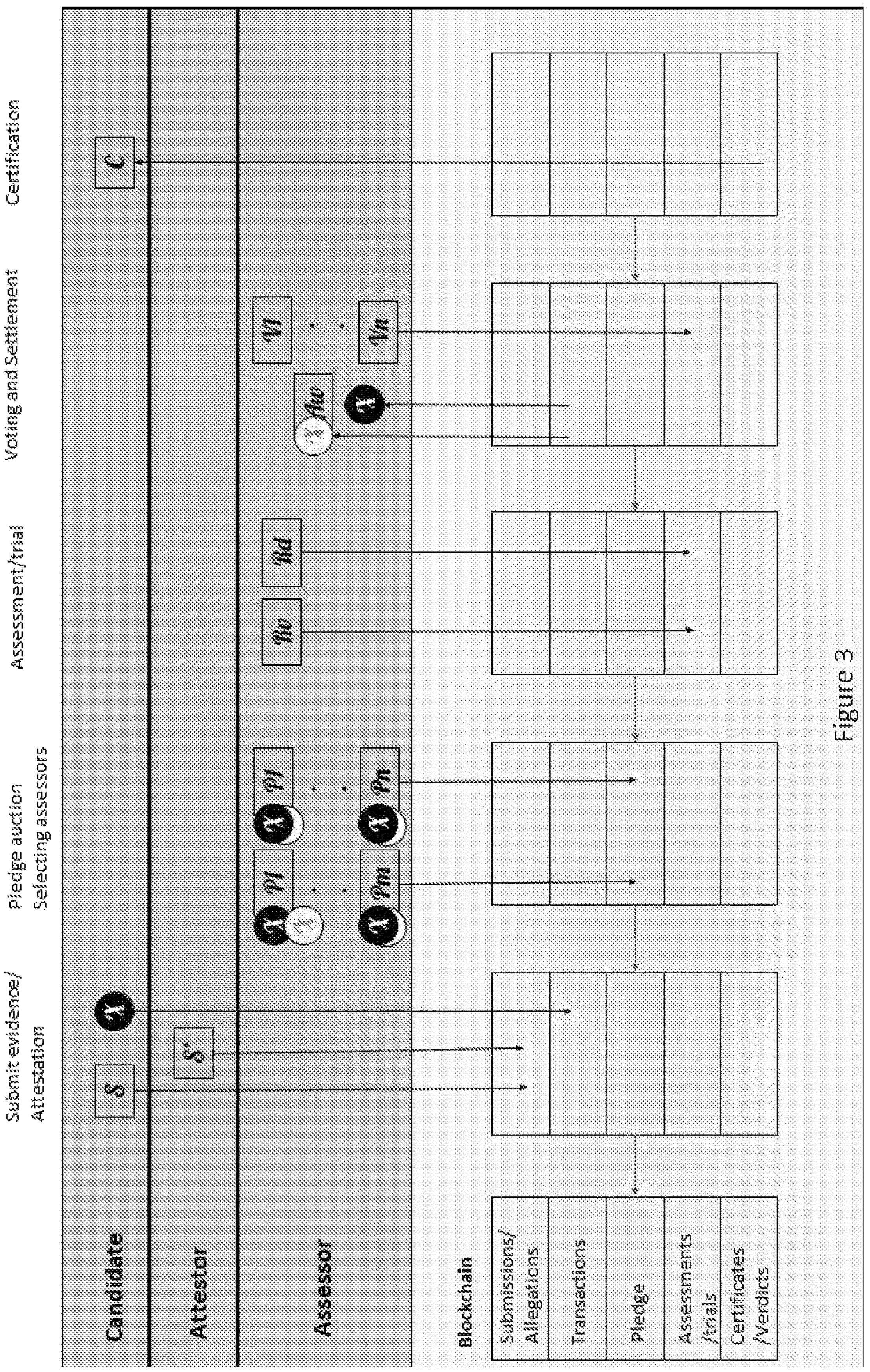
Figure 4:
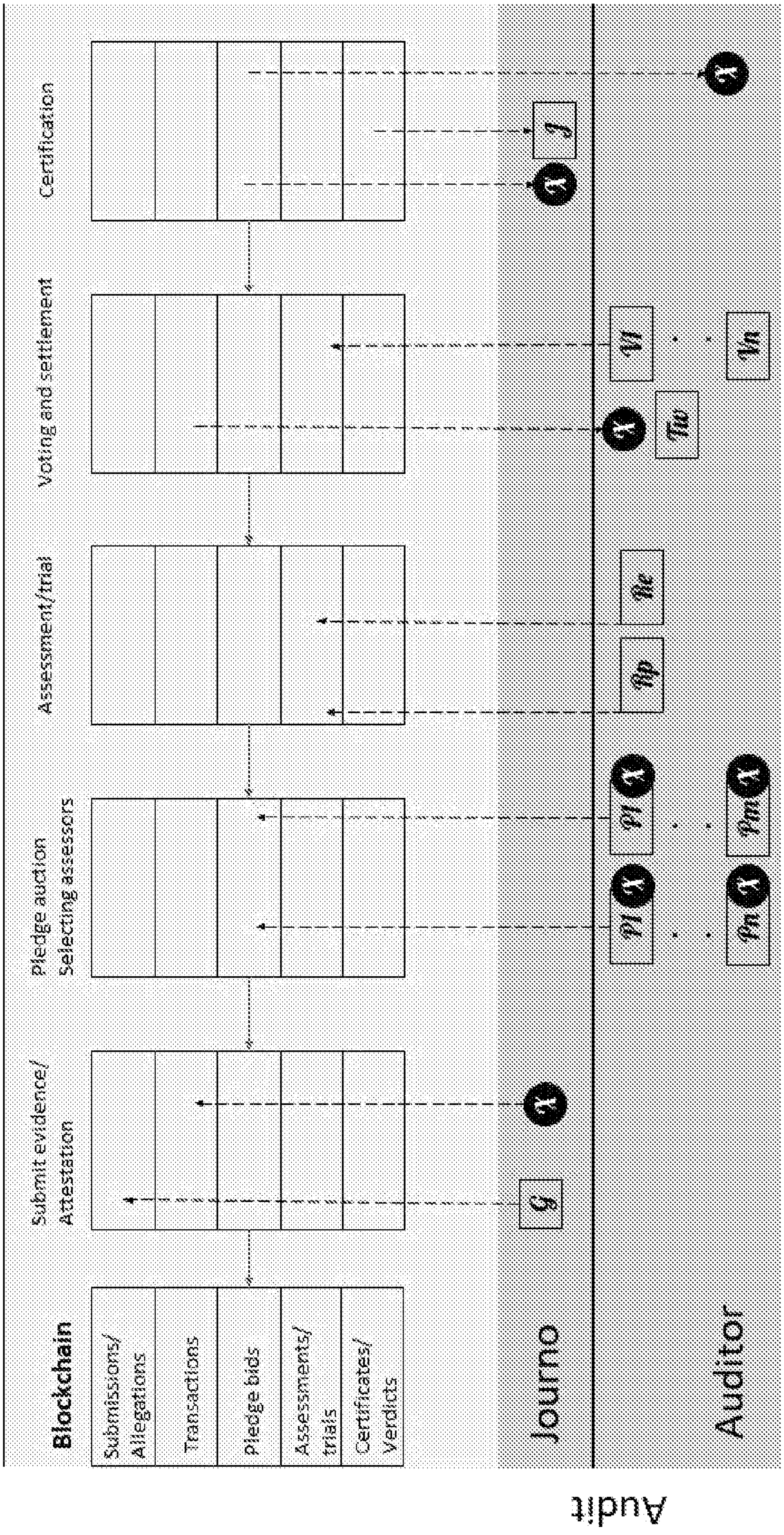

FIG. 3 provides a diagrammatic illustration of steps executed in a method of issuing digital attribute certificates provided in accordance with a further embodiment. FIG. 4 provides a diagrammatic illustration of steps executed in a method of invalidating fraudulent digital attribute certificates provided in accordance with the embodiment of FIG. 3. These figures set out the steps executed by these methods by illustrating the information transmissions received or provided by the invention relative to a block chain data structure used to record this information.

The following entities can participate in these methods:

| Candidate |
|---|
| At any time<br>1. Submit evidence of skills for assessment via Submit.AddEvidence<br>2. Retrieve skills certificate 𝒸 via Submit.GetCert<br>3. Verify 𝒸 is valid |
| **Journo** |
| At any time<br>1. Renew expired pledges via Manage.ReportPledge<br>2. Pledge new collateral for report via Manage.ReportPledge<br>3. Report fraud via Manage.ReportFraud<br>4. Check if the alleged participant is convicted. |
| **Assessor** |
| At any time<br>1. Broadcast new framework 𝒻 to the network via Manage.AddFrame<br>On receiving frameworks from other assessors:<br>1. Join interim community via Manage.JoinInterim<br>2. Vote if other members of the interim community can join it permanently via Manage.VoteInterim<br>On conception of a community around framework 𝒻:<br>1. Apply to join a community via Manage.JoinCom<br>2. Pledge a collateral for assessing new membership applications via Assess.AddPledge<br>3. Vote on new membership applications via Assess.VoteNewMember.<br>4. Pledge for moving to fire a member via Assess.AddPledge<br>5. Move to fire an assessor from the community via Assess.MoveFire<br>6. Vote on firing an assessor from the community via Assess.VoteFire<br>On receiving evidence submitted by learners:<br>1. Participate in pledge auctions via Assess.AddPledge<br>2. Sign and broadcast assessment reports to the community via Assess.SealAssessment<br>3. Vote on assessment undertaken by other assessors in the community via Assess.VoteAssessments |
| **Auditor** |
| At any time<br>1. Renew Expired pledges via Manage.AuditPledge<br>2. Pledge a collateral for auditing a participant via Manage.AuditPledge<br>3. Sign and broadcast audit reports to the network via Manage.AddAuditReport |

The following symbols are used in FIGS. 3 and 4:

| | | | | | |
|---|---|---|---|---|---|
| S | Submission/Evidence | Rv | Approval report | Aw | Winning Assessor |
| ● | XertCoin token | Rd | Disapproval roport | Tw | Winning auditor |

-continued

| | | | | | |
|---|---|---|---|---|---|
| Pn | Pledge | Ap | Prosecution report | G | Fraud allegation |
| Vn | Voter | Re | Defence report | J | Journo |
| C | Certificate of skill | | Community token | S' | Attestation |

The methods illustrated with respect to FIGS. 3 and 4 utilise the following operations:

| Network |
|---|
| At each epoch t in the ledger Lr<br>1. For each new block check if:<br>a. The block is in the valid format<br>b. All transactions are valid.<br>c. All proofs are valid<br>d. All pledge bids are valid<br>e. All certificates and verdicts are valid<br>f. Discard block if any of the above fails<br>2. For each new submission $\mathcal{S}$ introduced in t:<br>a. Add $\mathcal{S}$ to the submissions list<br>b. Lock $\mathcal{S}$.funds<br>c. If $\mathcal{S}$ is accepted by the community:<br>i. lock $\mathcal{S}$.pledges<br>ii. run Submit.AssignAssessors<br>3. For each S in the submissions list:<br>a. Check if $\mathcal{S}$ has expired or withdrawn:<br>i. Remove $\mathcal{S}$ from submissions list<br>ii. Return unspent $\mathcal{S}$.funds<br>b. Check if $\mathcal{S}$ is assessed by the deadline:<br>i. If not, penalise assessors pledge collateral and reintroduce $\mathcal{S}$ to the community<br>ii. If yes, remove $\mathcal{S}$ from submissions list<br>iii. Split and transfer $\mathcal{S}$.funds to assessors and voters based on community rules<br>4. For each new allegation $\mathcal{G}$ introduced in t:<br>a. Add $\mathcal{G}$ to the allegations list<br>b. Lock $\mathcal{G}$.pledge<br>c. If $\mathcal{G}$ is accepted by prosecution and defence auditors $\mathcal{T}$:<br>i. Lock $\mathcal{T}$.funds<br>ii. Run Manage.AssignAuditors<br>5. For each $\mathcal{G}$ in the allegations list:<br>a. Check if $\mathcal{G}$ has expired or withdrawn:<br>i. Remove $\mathcal{G}$ from allegations list<br>ii. Return unspent $\mathcal{G}$.pledge<br>b. Check if $\mathcal{G}$ is audited by the deadline:<br>i. If not, penalise auditor's pledge collateral and reintroduce $\mathcal{G}$ to the network<br>ii. If yes, remove $\mathcal{G}$ from allegations list<br>iii. If alleged participant is convicted, check their role and penalise them<br>iv. If alleged participant is not guilty, penalise journo |

As can be seen from a comparison with the methods of FIGS. 1 and 2 a similar set of operations and actions are completed with the methods of FIGS. 3 and 4. In addition, the embodiment of FIGS. 3 and 4 allows for the participation of a Candidate—as opposed to the Learner of FIGS. 1 and 2—reflecting the ability to use the invention to certify a wide range of attributes other than the simple possession of a skill or knowledge.

As can also be seen by these figures the embodiment of FIGS. 3 and 4 allow for the participation of an attester entity which contributes to the evidence accompanying a certification request. Furthermore the labels identifying the various forms of information held as block data reflect the handling and storage of Submission and/or Allegations, Assessments and/or trials and Certificates and/or Verdicts.

In the preceding description and the following claims the word "comprise" or equivalent variations thereof is used in an inclusive sense to specify the presence of the stated feature or features. This term does not preclude the presence or addition of further features in various embodiments.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

I claim:

1. A non-transitory computer readable medium bearing computer readable digital attribute certificate invalidation instructions for a member entity programmable device, these instructions arrange to execute the steps of:

a. receiving and transmitting a certification request and evidence information to a member entity, the evidence information demonstrating possession of an attribute to be certified by the candidate entity with the member entity possessing an entity-specific attribute certificate signed via private/public key pairs that attests to an ability of the member entity to assess the possession of the attribute by the candidate entity, the attribute to be certified being any one or combination of the possession by the candidate entity of a skill or knowledge, meeting of a standard of behavior, possession of a physical or intangible resource, the successful competition of an assessment process, the meeting of a threshold performance measurement, the possession of the ability to assess one or more attributes of other entities, and/or the meeting of the standards of a professional or certification body, b. soliciting and transmitting at least one pledge from the member entity, the pledge transmitted being a cryptographically secured digital pledge to certify possession of the attribute of the candidate entity based on the evidence information, the pledge including or identifying an entity-specific attribute certificate signed via private/public key pairs awarded to the member entity that attests to an ability of the member entity to assess the possession of the attribute by the candidate entity, the pledge including or being associated with an amount of digital currency, and receiving an indication determining if the member entity has been identified as a contracted member based on the amount of digital currency and/or entity-specific attribute certificate included or identified by the pledge transmitted, contracted members being a subset of all member entities to which the certification request and evidence information were transmitted, c. if the member entity is identified as a contracted member soliciting and transmitting at least one assessment report prepared by the member entity that indicates an assessment by the member entity of the possession of the attribute by the candidate entity based on the evidence information, d. receiving and presenting assessment reports prepared by the subset of contracted members to the member entity, e. soliciting and transmitting a certification vote from the member entity to determine if a digital attribute certificate signed via private/public key pairs is to be issued and stored on a distributed, cryptographically secured distributed, cryptographically secured block chain database in response to the received certification request and evidence information, and f. receiving a plurality of certification votes from member entity's and issuing an entity-specific attribute certificate signed via private/public key pairs based on the votes received, and distributing entity-specific attribute certificate signed via private/public key pairs from the distributed, cryptographically secured block chain database to a requesting entity, wherein the digital attribute certificate encodes reference to any one or combination of the certification request, the evidence information, the cryptographically secured digital pledge, the assessment report, and the determination vote.

2. The non-transitory computer readable medium as claimed in claim 1, wherein the instructions arrange to execute the steps of:

i. receiving and presenting to a member entity a fraud report and complaint data specifying or identifying an attribute certificate stored on a block chain database, ii. soliciting and transmitting at least one pledge from the member entity and receiving an indication determining if the member has been identified as a prosecution member or a defensive member based on the pledge transmitted, prosecution and defensive members being a subset of all member entities to which the fraud report and complaint data were transmitted, iii. if the member entity is identified as either a prosecution member or a defensive member soliciting and transmitting at least one validity report prepared by the member entity, iv. receiving and transmitting validity reports prepared by the subset of prosecution and defensive members to the member entity, V. soliciting and transmitting a validity vote from the member entity to determine if at least one corrective action is to be executed on the attribute certificate in response to the received fraud report and complaint data.

3. The non-transitory computer readable medium as claimed in claim 2 wherein a fraud report is associated with or includes an amount of a digital currency.

4. The non-transitory computer readable medium as claimed in claim 2 wherein a fraud report is associated with or includes or identifies at least one attribute certificate awarded to a reporting member entity which prepared the fraud report.

5. The non-transitory computer readable medium as claimed in claim 2 wherein member entity pledges include or identify at least one attribute certificate awarded to the pledging member entity.

6. The non-transitory computer readable medium as claimed in claim 2 wherein member entity pledges include or are associated with an amount of a digital currency.

7. The non-transitory computer readable medium as claimed in claim 2 wherein a corrective action executed on an attribute certificate in response to the received fraud report includes committing a sub-block to the block chain originally storing the attribute certificate, the sub-block incorporating a notification that the attribute certificate is invalid.

8. The non-transitory computer readable medium as claimed in claim 2 wherein a corrective action executed on an attribute certificate includes adding the identity of the attribute certificate to a register of invalidated attribute certificates, the register being stored as a publicly accessible resource independent of the block chain database used to store the attribute certificate.

9. The non-transitory computer readable medium as claimed in claim 1 wherein member entities consist of or include any one or more of a single person, group of people or organisation or an artificial intelligence software agent.

10. The non-transitory computer readable medium as claimed in claim 1 wherein evidence information accompanying a certification request consists of or includes any one or more of photographs, video or records related to a work product example, reports of inspections undertaken of physical premises or assets, results of third party assessments, and/or testimonial or attestation evidence from third parties related to the possession of an attribute.

11. The non-transitory computer readable medium as claimed in claim 1 wherein a certification request is associated with an amount of a digital currency.

12. The non-transitory computer readable medium as claimed in claim 1 wherein assessment reports consist of or include any one or more of text, photographs, video or other records produced by a member entity using an assessment framework, reports of inspections undertaken of physical premises or assets and/or testimonial or attestation evidence from third party entities.

13. The non-transitory computer readable medium as claimed in claim 1 wherein the completion of a decision to issue an attribute certificate triggers the release of digital currency associated with a certification request to at least one contracted member entity.

14. A non-transitory computer readable medium bearing computer readable digital attribute certificate issue and distribution instructions for a processing platform including at least one programmable device, these instructions arranged to execute the steps of:

receiving a certification request from a candid entity, the request being associated with or accompanied by evidence information demonstrating possession of an attribute to be certified by the candidate entity with the member entity possessing an entity-specific attribute certificate signed via private/public key pairs that attests to an ability of the member entity to assess the possession of the attribute by the candidate entity, the attribute to be certified being any one or combination of the possession by the candidate entity of a skill or knowledge, meeting of a standard of behavior, possession of a physical or intangible resource, the successful competition of an assessment process, the meeting of a threshold performance measurement, the possession of the ability to assess one or more attributes of other entities, and/or the meeting of the standards of a professional or certification body, distributing the request and evidence information to a plurality of member entities, receiving pledges from at least one member entity of the plurality of member entities, the pledge received being a cryptographically secured digital pledge to certify possession of the attribute by the candidate entity based on the evidence information, the pledge including or identifying an entity-specific attribute certificate signed via private/public key pairs awarded to the member entity that attests to an ability of the member entity to assess the possession of the attribute by the candidate entity, the pledge including or being associated with an amount of digital currency, and identifying a subset of contracted members drawn from the plurality of member entities based on the amount of digital currency and/or entity-specific attribute certificate included or identified by the pledges received, receiving assessment reports from the subset of contracted members that indicates an assessment by the contracted member entity of the possession of the attribute by the candidate entity based on the evidence information and communicating the received assessment reports to the plurality of member entities, receiving certification votes from the plurality of member entities to determine if a digital attribute certificate signed via private/public key pairs is to be issued and stored on a distributed, cryptographically secured distributed, cryptographically secured block chain database in response to the received certification request and evidence information, and issuing an entity-specific attribute certificate signed via private/public key pairs based on the votes received, and distributing entity-specific attribute certificate signed via private/public key pairs from the distributed, cryptographically secured block chain database to a requesting entity, wherein the digital attribute certificate encodes reference to any one or combination of the certification request, the evidence information, the cryptographically secured digital pledge, the assessment report, and the determination vote.

15. The non-transitory computer readable medium as claimed in claim 14, wherein the instructions arrange to execute the steps of:

receiving a fraud report from a reporting entity, the fraud report being associated with or accompanied by complaint data specifying or identifying an attribute certificate distributing the report and complaint data to a plurality of member entities receiving pledges from at least one member entity of the plurality of member entities and identifying a subset of at least one prosecution member and at least one defensive member drawn from the plurality of member entities based on the pledges received, receiving validity reports from each of the prosecution and defence members and communicating the received reports to the plurality of members receiving validity votes from the plurality of members and identifying at least one corrective action based on the received votes, Executing the identified corrective action or actions on the attribute certificate stored on the block chain database.

* * * * *